J. P. Jamison,
Crimping Leather,
No. 2,497. Reissued Feb. 26, 1867.
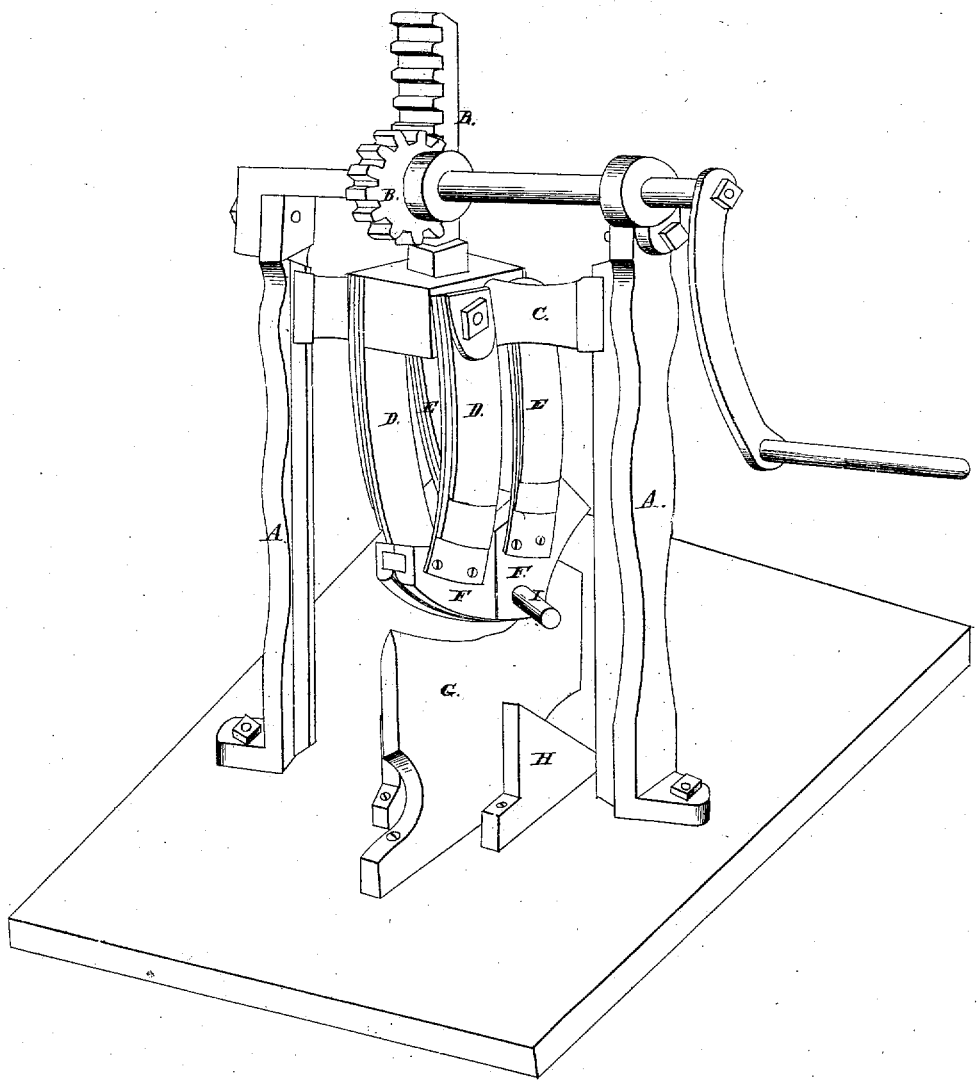
THE NORRIS PETERS CO., WASHINGTON, D. C.

United States Patent Office.

JOHN P. JAMISON, OF NEW YORK, N. Y.

*Letters Patent No.* 54,735, *dated May* 15, 1866; *reissue No.* 2,497, *dated February* 26, 1867.

IMPROVEMENT IN CRIMPING MACHINES.

The Schedule referred to in these Letters Patent and making part of the same.

TO ALL WHOM IT MAY CONCERN:

Be it known that I, JOHN P. JAMISON, of the city, county, and State of New York, have invented a new and useful Improvement on Crimping Machines, applicable to crimping leather for boot fronts, of which the following is a full, clear, and exact description, reference being had to the accompanying drawing, forming part of this specification, and in which the figure marked No. 1 represents a view in perspective of a machine constructed according to my invention.

The nature of my invention consists of a crimping machine or device, made up of reciprocating elastic jaws or stretchers, for operation in connection with a fixed crimping form or block. Also in a peculiar relative attachment and action of the front and back spring-jaws, in combination with the crimping form or block.

Referring to the accompanying drawing, A represents a frame, carrying a pinion, which works into a rack, B, and that may be operated by a crank or handle connected with its shaft. C is a cross-piece, to which said rack is attached, and that is fitted to slide up and down the frame, by which it is guided. D and E are springs, connected at their one end with the cross-piece C. The one spring, or springs, D, and which may be said to lie in front, may be secured in a stationary manner, by a bolt or bolts, to the cross-piece C, while the other spring or springs E, which may be described as lying in the rear, may be made fast to a rod by a nut at either end, said rod playing in the cross-piece C. At the opposite or bottom ends of the springs D and E are secured jaws or stretchers F. G is the crimping form or block upon which the leather is laid to receive the action of the jaws or stretchers. This block may be secured by screws to the bed of the machine. H represents an inclined plane or planes, also connected with the bottom or bed of the machine. The back jaw or jaws F may be provided with a roller or rollers, I, over the side or sides of the crimping form, for action on the inclined plane or planes H.

To operate the machine, the crank or handle working the pinion that gears into the rack B is turned in an appropriate direction to bring down the cross-piece C, causing the jaws F also to descend, the front jaw or jaws attached to the spring or springs D coming down perpendicularly, as it were, on the work, and serving to hold the leather, while the back jaw or jaws, carried by the spring or springs E, are caused, by the action of the roller or rollers I, acting on the inclined plane or planes H, to stretch and smoothly adjust to its proper place the back or opposite part of the leather. By reason of the jaws F being carried by springs, as described, and whereby they may be denominated spring-jaws, the machine readily adapts itself to different thicknesses of leather on the form or block, and becomes self-regulating. A single stroke of the machine may suffice to produce a perfect crimping action.

What I here claim as new and useful is—

1. In combination with a crimping form or block G, jaws or stretchers F, carried by springs D or E, so as to form thereof elastic jaws, and arranged to reciprocate in common with a cross-piece C, or its equivalent, substantially as specified.

2. The springs D and E, the one of which is stationary in its connection with the reciprocating cross-piece C, while the other is hung thereto so as to be capable of play for operation of the jaw or stretcher, which it carries by the action of an inclined plane H, or its equivalent, essentially as and for the purpose herein set forth.

JOHN P. JAMISON.

Witnesses:

A. LE CLERC,

J. W. COOMBS.